Figure 1:
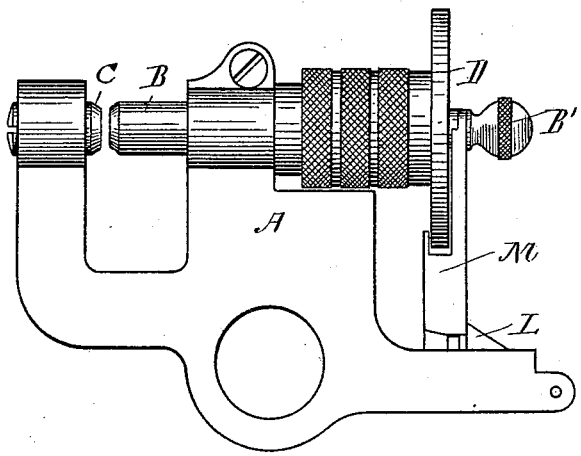

(No Model.) 2 Sheets—Sheet 1.

M. M. BARNES.
MICROMETER CALIPERS.

No. 346,705. Patented Aug. 3, 1886.

WITNESSES.
J. Henry Taylor.
James F. Bligh.

INVENTOR.
M. M. Barnes
by Alex. D. Browne,
attorney.

(No Model.) 2 Sheets—Sheet 2.
M. M. BARNES.
MICROMETER CALIPERS.

No. 346,705. Patented Aug. 3, 1886.

WITNESSES.
J. Henry Taylor.
James F. Bligh

INVENTOR.
M. M. Barnes
by Alex. P. Browne,
attorney.

UNITED STATES PATENT OFFICE.

MERRICK M. BARNES, OF BOSTON, MASSACHUSETTS.

MICROMETER-CALIPERS.

SPECIFICATION forming part of Letters Patent No. 346,705, dated August 3, 1886.

Application filed October 19, 1885. Serial No. 180,298. (No model.)

*To all whom it may concern:*

Be it known that I, MERRICK M. BARNES, of Boston, in the county of Suffolk and State of Massachusetts, a citizen of the United States, have invented certain new and useful Improvements in Micrometer-Calipers, of which the following is a specification.

My invention relates particularly to improvements in such instruments, whereby is obtained a valuable increase in the accuracy and facility with which the amount of motion of the calipering-screw may be read; and the main object of my invention is to so construct the instrument, and especially those portions of it which show the extent of motion of the calipering-screw, that this may be read micrometrically and with increasing convenience upon a single scale, which scale may be divided regularly—as, for example, to represent thousandths—or arbitrarily—as, for example, to represent divisions of the Stubbs, or Birmingham, or other arbitrary list of sizes.

Heretofore it has been generally the custom in the case of micrometer-calipers to employ two scales—one by which to read the number of entire revolutions of the calipering-screw, the other by which to read the extent of a fractional or partial revolution. The number of complete revolutions has heretofore been read by noting the distance traveled by the calipering-screw in either direction past a scale. In this way the head of the calipering-screw, moving outward or inward, has itself served as the index or pointer to show actually, but not micrometrically, the extent of its own travel over the scale. The fractions of a turn have been measured micrometrically by graduating or dividing regularly a circle upon the periphery of the head of the calipering-screw, thus forming a moving scale, and noting the extent of travel of this graduated circle past a fixed pointer, commonly a "zero-line," so called, drawn upon some fixed portion of the instrument past which the head of the calipering-screw moves. In each case, however, the head of the calipering-screw has itself served both as a scale for one reading and as a pointer for another reading. Calipers have also been devised in which the reading was done upon a single scale, as shown in Letters Patent No. 235,133, to S. Darling. The construction of this device, however, is such that, the scale being placed of necessity on the side of the instrument, the calipers cannot be read conveniently when held vertically, as is often necessary in calipering sheet metal. By my present improvement I have dispensed with the two scales and the double reading, partly actual and partly micrometric, and in their place I have substituted a single continuous graduated scale, upon which may be observed micrometrically and at one reading the total distance traveled by the measuring end of the calipering-screw. I also provide an index, the position of which upon the single continuously-graduated scale shows at a single reading the sum of the complete turns and fraction of a turn of the calipering-screw—in other words, the entire distance through which it is moved. Furthermore, by my present improvement I am enabled to locate the scale so that it may be easily read when the calipering-screw is held vertically—as, for instance, in calipering sheets of metal plate.

Figure 2:
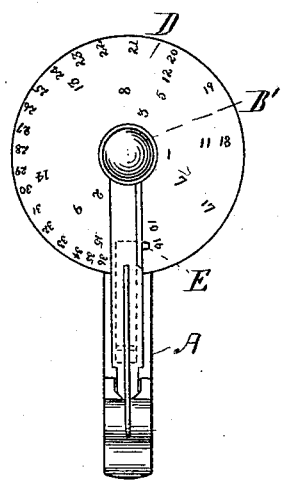
Figure 3:
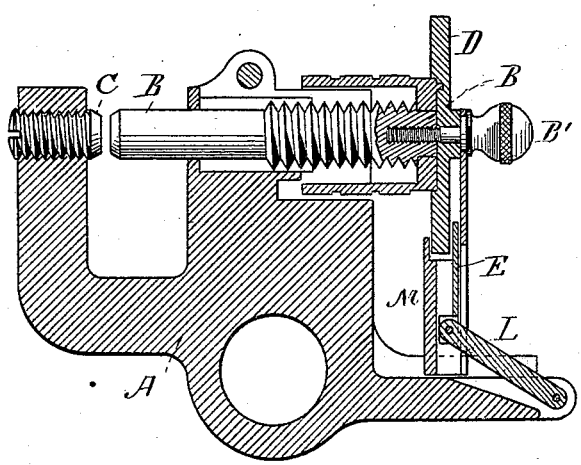
Figure 6:
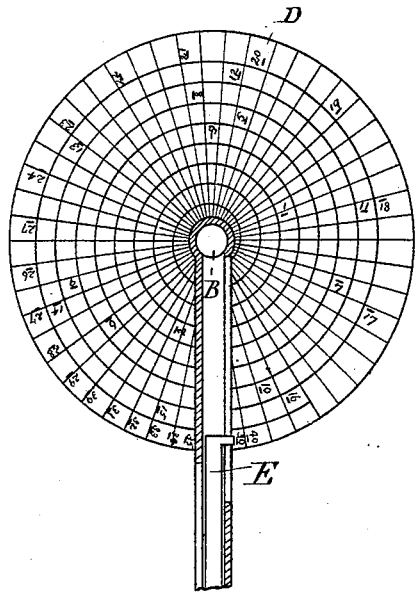
Figure 7:
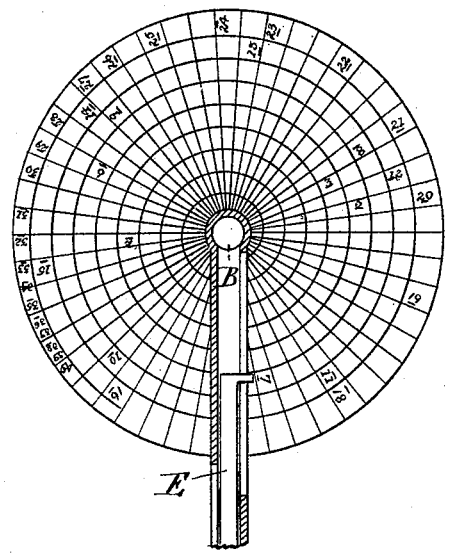
Figure 4:
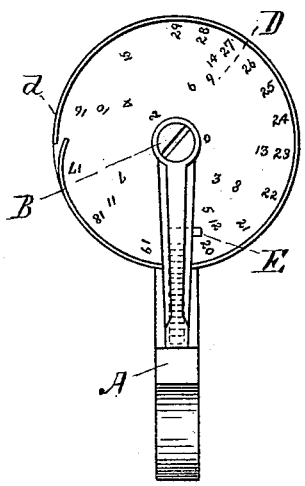
Figure 5:
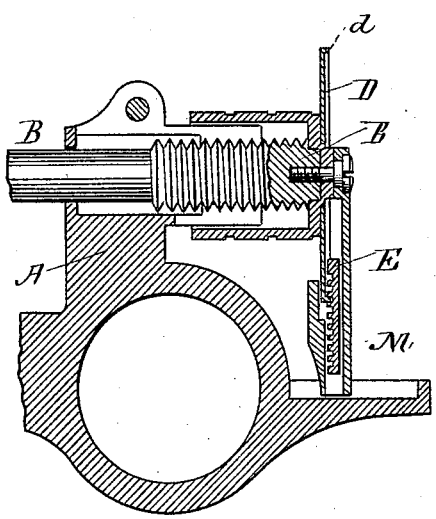

In the accompanying drawings I have represented two structures embodying my present invention, Figures 1 to 3 showing one of these structures in side elevation and end elevation and section. Figs. 4 and 5 show the other in end elevation and section, respectively. Figs. 6 and 7 are enlarged diagrammatic views of the scale and pointer, intended to illustrate their joint relation and operation.

It will be seen that in each of the devices shown in the drawings I have the ordinary yoke or frame, A, one arm carrying the micrometer calipering-screw B, and the other the anvil C, in the usual manner. In each instance, also, I have a single continuous graduated scale, D, and a pointer, E. I form the continuous graduated scale upon a disk, which is mounted upon and carried by the calipering-screw B, being secured thereto by a clamping-screw, B', as shown. The graduated scale upon the disk, being arranged in the form of a curve extending from the periphery toward the center, requires that the pointer E, in order to follow the curve of the graduation, be provided with suitable mechanism for giving it this regular motion. For this purpose I prefer the construction shown, in which the pointer is pivotally attached to a link, L, the other end of which is pivoted to an extension of the frame A. The pointer moves up and down in and is vertically guided by a hollow box, M, arranged to slide in and out upon the extension of the arm A above mentioned, and so connected with the calipering-screw B as to be carried in or out as the latter is moved toward or away from the anvil. The connection between this box and the calipering-screw is conveniently made by a shoulder on the head of the screw B', a circular slot being formed in the upper part of the box to allow the screw B' to pass through. The parts being so connected, it is obvious that as the calipering-screw is moved outwardly and carries the box M with it the thrust of the latter against the pointer E, mounted on the pivoted link L, will cause the pointer to move toward the center of the disk D. Conversely, the inward motion of the screw B will cause the pointer E to move away from the center. This motion of the pointer, as has been said, is required only to keep it at all times coincident with the graduation upon the disk, and the passage of the graduated scale past the pointer enables the operator to observe at a single reading micrometrically the extent of movement of the calipering-screw. This scale, as before, may be graduated arbitrarily or regularly, as may be preferred, and with the construction shown in Figs. 1 to 3 a number of disks may be employed, each being graduated or marked to correspond with the arbitrary figures or sizes of any of the lists in common use, and one disk regularly graduated to represent thousandths may be provided, the construction of the machine admitting of the ready interchange of these disks.

The graduation shown in Fig. 2 represents a graduation showing the numbers of the "American Wire-Gage," so called.

In Figs. 4 and 5 I have shown a different arrangement for keeping the pointer upon the scale, which I will now proceed to describe. The pointer E slides vertically in a sliding box, M, as before; but its vertical movement in this case is obtained by means of a series of notches formed upon the pointer and engaging consecutively with a rib or cam, d, upon the disk D. At each revolution of the disk D one end of this rib enters a fresh notch upon the pointer E, thereby moving it gradually inwardly or outwardly toward or away from the center of the disk D as the latter is turned in one direction or the other.

Other constructions than those shown may be employed for giving the pointer E the necessary in-and-out motion to keep it always in bearing upon the scale.

I do not seek to claim, broadly, herein the use of a single continuous scale in micrometer-calipers, nor the placing of such a scale upon the side of the calipering-screw. Neither do I make any claim, broadly, to the idea of graduating the periphery of the head of the calipering-screw. I also make no claim herein to the specific arrangement of devices illustrated in Figs. 4 and 5, as they will form the subject of a future application shortly to be made by me.

I claim—

1. In micrometer-calipers, the combination of the following elements, viz: a calipering-screw, a disk or plate carried upon the head of the calipering-screw, a single continuous scale carried upon said disk or plate, the scale being adapted to measure the total distance traveled by the measuring end of the calipering-screw, a pointer past which the said scale moves, and mechanism, substantially as set forth, for keeping the pointer always in bearing upon the scale.

2. In micrometer-calipers, the combination of the following elements, viz: a calipering-screw, a removable disk or plate carried upon the head of the calipering-screw, a single continuous scale carried upon said disk or plate, the scale being adapted to measure the total distance traveled by the measuring end of the calipering-screw, a pointer past which the said scale moves, and mechanism, substantially as set forth, for keeping the pointer always in bearing upon the scale.

3. In a micrometer measuring device, the combination of a screw, B, a disk, D, carrying a single continuous scale of the character hereinbefore described, and connected to and rotating with the screw B, a pointer, E, a hollow guide-box, M, connected with the screw B, as described, and suitable mechanism, substantially as set forth, for moving the pointer E within the box M, to follow the convolutions of the scale.

4. In a micrometer measuring device, the combination of the frame A, measuring-screw B, a disk, D, carrying a single continuous scale of the character hereinbefore described, and connected and rotating with the screw B, a pointer, E, link L, and a guide box, M, connected with the screw B, whereby the pointer is moved inwardly or outwardly over the disk to follow the graduation, all substantially as set forth.

5. The improved attachment for micrometer-calipers herein described, consisting of a removable plate or disk, D, marked on one face with a continuous graduated scale adapted to measure the total distance traveled by the measuring end of the calipering-screw, all substantially as set forth, and for the purpose herein specified.

In testimony whereof I have hereunto subscribed my name this 17th day of October, A. D. 1885.

MERRICK M. BARNES.

Witnesses:
JAMES F. BLIGH,
J. HENRY TAYLOR.